United States Patent
Norioka et al.

(10) Patent No.: US 10,814,312 B2
(45) Date of Patent: Oct. 27, 2020

(54) DESULFURIZING AGENT FOR GASES AND GAS DESULFURIZATION METHOD

(71) Applicant: Osaka Gas Co., Ltd., Osaka (JP)

(72) Inventors: Shimpei Norioka, Osaka (JP); Susumu Takami, Osaka (JP); Hirofumi Ohtsuka, Osaka (JP); Takenori Hirano, Izumi (JP)

(73) Assignee: Osaka Gas Co., Ltd., Osaka (JP)

( * ) Notice: Subject to any disclaimer, the term of this patent is extended or adjusted under 35 U.S.C. 154(b) by 0 days.

(21) Appl. No.: 16/614,892

(22) PCT Filed: May 15, 2018

(86) PCT No.: PCT/JP2018/018772
§ 371 (c)(1),
(2) Date: Nov. 19, 2019

(87) PCT Pub. No.: WO2018/216555
PCT Pub. Date: Nov. 29, 2018

(65) Prior Publication Data
US 2020/0108371 A1    Apr. 9, 2020

(30) Foreign Application Priority Data

May 25, 2017    (JP) ................... 2017-103807

(51) Int. Cl.
*B01J 21/04*    (2006.01)
*B01J 23/06*    (2006.01)
(Continued)

(52) U.S. Cl.
CPC ............. *B01J 23/892* (2013.01); *B01J 23/80* (2013.01); *B01J 37/0213* (2013.01);
(Continued)

(58) Field of Classification Search
CPC ... B01J 23/06; B01J 23/60; B01J 23/80; B01J 23/892; B01J 23/8926; B01J 23/8953; C10L 3/102; C10L 3/12; C10L 3/103
See application file for complete search history.

(56) References Cited

U.S. PATENT DOCUMENTS 4,734,536 A *   3/1988   Nagahara ................. B01J 23/60
                                                                       585/266
4,913,842 A *   4/1990   Yoneoka ................. B01B 1/005
                                                                       252/373
(Continued)

FOREIGN PATENT DOCUMENTS

CN          102211029 A      10/2011
JP           61263634 A      11/1986
(Continued)

OTHER PUBLICATIONS

De Los Reyes et al., "Kinetic approach in the comparison of supported and unsupported ternary nickel-ruthenium-sulphur compounds in hydrotreating reacitons", Applied Catalysis A: General, 1993, pp. 79-85, vol. 103, No. 1.

(Continued)

*Primary Examiner* — Cam N. Nguyen
(74) *Attorney, Agent, or Firm* — The Webb Law Firm (57) ABSTRACT

Provided are a high-performance desulfurizing agent for gases and a gas desulfurization method that provide a high desulfurization performance even at low temperatures and can maintain its desulfurization performance for a long period of time. The desulfurizing agent is characterized in that it includes a zinc oxide, an aluminum oxide and copper, the agent further including nickel by from 1.0 mass % to 10 mass % and ruthenium by from 0.1 mass % to 1.0 mass %. The gas desulfurization method is characterized in that the desulfurizing agent is brought into contact with the gas in the (Continued)

coexistent of hydrogen, thus decomposing/removing sulfur compound contained in the gas.

2 Claims, 1 Drawing Sheet

(51) Int. Cl.
*B01J 23/60* (2006.01)
*B01J 23/80* (2006.01)
*B01J 23/89* (2006.01)
*C10L 3/10* (2006.01)
*C10L 3/12* (2006.01)
*B01J 37/02* (2006.01)
*B01J 37/08* (2006.01)

(52) U.S. Cl.
CPC ........... *B01J 37/0236* (2013.01); *B01J 37/08* (2013.01); *C10L 3/103* (2013.01); *C10L 3/12* (2013.01); *C10L 2290/542* (2013.01)

(56) References Cited

U.S. PATENT DOCUMENTS

| | | | | |
|---|---|---|---|---|
| 5,302,470 | A * | 4/1994 | Okada | C01B 3/38 423/244.1 |
| 6,042,798 | A * | 3/2000 | Masuda | B01J 23/80 423/244.01 |
| 6,930,074 | B2 * | 8/2005 | Khare | B01J 20/02 502/342 |
| 7,268,097 | B2 * | 9/2007 | Katsuno | B01J 20/0222 208/217 |
| 7,776,785 | B2 * | 8/2010 | Takatsu | B01J 35/002 502/343 |
| 7,820,037 | B2 | 10/2010 | Masuda et al. | |
| 8,088,708 | B2 * | 1/2012 | Takatsu | B01J 23/80 208/213 |
| 8,461,373 | B2 * | 6/2013 | Suzuki | B01J 35/10 560/103 |
| 8,486,163 | B2 * | 7/2013 | Kim | B01J 19/0093 422/502 |
| 8,906,227 | B2 * | 12/2014 | Bourane | B01J 35/026 208/247 |
| 8,920,635 | B2 * | 12/2014 | Bourane | B01J 37/031 208/247 |
| 9,663,725 | B2 * | 5/2017 | Bourane | C10G 29/16 |
| 9,975,105 | B2 * | 5/2018 | Miyama | C01B 3/58 |
| 2003/0183803 | A1 * | 10/2003 | Price | B01J 20/3078 252/189 |
| 2003/0203815 | A1 * | 10/2003 | Khare | B01J 20/18 502/400 |
| 2007/0281203 | A1 * | 12/2007 | Kobayashi | B01J 21/04 252/373 |
| 2008/0197051 | A1 * | 8/2008 | Kwak | B01J 20/0237 208/246 |
| 2012/0021305 | A1 * | 1/2012 | Nagayasu | B01J 20/0225 429/410 |
| 2016/0222308 | A1 * | 8/2016 | Wakita | C10G 25/003 |

FOREIGN PATENT DOCUMENTS

| | | |
|---|---|---|
| JP | 1123627 A | 5/1987 |
| JP | 1123628 A | 5/1987 |
| JP | 6212173 A | 8/1994 |
| JP | 1161154 A | 3/1999 |
| JP | 11335101 A | 12/1999 |
| JP | 2001286753 A | 10/2001 |
| JP | 2007254728 A | 10/2007 |

OTHER PUBLICATIONS

Matsuhisa, "Recent Progress in Industrial Catalyst Technology for Steam Reforming Reaction", Catalysts & Catalysis, 2006, pp. 326-332, vol. 48, No. 5.
Pecoraro et al., "Hydrodesulfurization Catalysis by Transition Metal Sulfides", Journal of Catalysis, 1981, pp. 430-445, vol. 67, No. 2.
Satokawa et al., "Adsorptive removal of dimethylsulfide and t-butylmercaptan from pipeline natural gas fuel on Ag zeolites under ambient conditions", Applied Catalysis B: Environmental, 2005, pp. 51-56, vol. 56, Issues 1-2.
Shiba, "Catalyst", 1959, pp. 49-47, vol. 1, No. 1.

* cited by examiner

DESULFURIZING AGENT FOR GASES AND GAS DESULFURIZATION METHOD

CROSS-REFERENCE TO RELATED APPLICATIONS

This application is the United States national phase of International Application No. PCT/JP2018/018772 filed May 15, 2018, and claims priority to Japanese Patent Application No. 2017-103807 filed May 25, 2017, the disclosures of which are hereby incorporated by reference in their entirety.

TECHNICAL FIELD

This invention relates to a desulfurizing agent for gases and a gas desulfurization method.

BACKGROUND ART

Steam reforming process is a process for obtaining hydrogen-based gas by reacting hydrocarbon with steam, the process being used for production of hydrogen for industrial use and fuel reforming of a fuel cell.

As raw material for steam reforming process, raw fuels based on light hydrocarbon such as natural gas, liquefied petroleum gas (LPG) or city gas using these as raw materials are particularly suitable since these contain little heavy hydrocarbon tending to cause carbon deposition and their sulfur contents are low also. However, even natural gas and liquefied petroleum gas (LPG) normally contain a trace amount of sulfur compound. Further, even city gas produced with using liquefied natural gas (LNG) substantially free from sulfur content is added with a trace amount of odorant for ensuring safety during transport.

Odorants commonly used include organic sulfuric compounds such as tertiary butylmercaptan (TBM), tetrahydrothiophene (THT), dimethyl sulfide (DMS), etc.

In a steam reforming reaction, there is employed a catalyst with Ni or Ru supported on a heat-resistant inorganic oxide. However, it is known that these can be poisoned by sulfur component, thus losing their activities quickly. Therefore, a raw material used in a steam reforming reaction essentially requires a desulfurization treatment for minimizing its sulfur component in advance.

As some typical desulfurization methods carried out prior to steam reforming of hydrocarbon, there are known hydrodesulfurization method (desulfurization with addition of hydrogen), adsorptive desulfurization method, super high-order desulfurization method, etc.

The hydrodesulfurization method is a method in which an organic sulfuric component contained in hydrocarbon raw material is reacted with hydrogen with using Co—Mo-based or Ni—Mo-based catalyst for hydrocracking, after which the resultant hydrogen sulfide is removed by being adsorbed on zinc oxide (Non-Patent Documents 1, 2). Hydrodesulfurization is in use widely, as being used also as a desulfurization process of fuel oil in petroleum refining. However, the adsorption of hydrogen sulfide onto zinc oxide can act also as an equilibrium reaction, so that remaining of a trace amount of sulfur component is inevitable.

Further, it is said that several tens of ppb of sulfur component leak into the steam reforming catalyst (Non-Patent Document 2).

The adsorptive desulfurization method adsorptively removes sulfur component at room temperature by means of zeolite containing a transition metal such as Ag, Cu, etc. (Patent Document 1, Non-Patent Document 3).

The adsorptive desulfurization method is advantageous in that desulfurization is possible at room temperature. Another advantage thereof is that addition of hydrogen is not needed. However, this method suffers a problem of desulfurization capacity per volume being limited. Another problem thereof is occurrence of further reduction in its adsorption performance if water is contained in the gas. The method suffers still further problems such as Ag having a relatively high water resistance being expensive, etc.

The super high-order desulfurization method removes sulfur component included in a raw material by bringing hydrocarbon raw material into contact with a desulfurizing agent based on copper-zinc in a temperature range from 100° C. to 400° C. in co-existence of hydrogen (Patent Documents 2, 3).

With this method, the concentration of sulfur component after the treatment can be reduced to be equal to or lower than 1 ppb, so poisoning of steam reforming catalyst can be prevented for a long period of time. However, this method can be said problematic in that a large amount of desulfurizing agent is required if a sufficient desulfurization performance is to be obtained at 300° C. or lower, as is the case with hydrodesulfurization.

In view of the above respect, Patent Document 4 discloses a desulfurizing agent prepared as follows. Namely, a desulfurizing agent manufactured by a method comprising: mixing a solution containing a copper compound and a zinc compound with an aqueous solution of an alkali substance to prepare a precipitate, calcining the resultant precipitate, forming a shaped form of a copper oxide-zinc oxide mixture from the slurry of the calcined precipitate, impregnating the shaped form with iron and/or nickel, calcining the impregnated form to produce a calcined oxide, and reducing the calcined oxide with hydrogen. This desulfurizing agent exhibits high desulfurization performance even at a low temperature. Notwithstanding, in such a situation where the mounting capacity is further limited and replacement of the agent is restricted as is the case with a fuel cell, there remains high necessity for a desulfurizing agent providing even higher performance.

Non-Patent Document 4 reports a result of comparison made at 400° C. among the activities of various kinds of element for hydrodesulfurization reaction of dibenzothiophene (DBT) said to exhibit relatively high desulfurization resistance. The activities of transition metals belonging in the fourth period (from Ti to Ni), the fifth period (from Zr to Pd), and the sixth period (from Ta to Au) are shown. And, it is reported that Ru (379.5), Ir (171.8), Rh (106.1) have high activities and that aside from platinum group, Mo (8.0), Cr (4.8), W (3.2), Nb (1.7), Ni (1.5), Ti (1.4), Co (1.4) etc. exhibit the activities of interest (values within the parentheses are numeric values obtained by dividing the number of DBT molecules reacted by 1 mol of metal and per second, by 10 (ten) to the 16 (sixteenth) power, values representing relative activity per atom).

Patent Document 5 proposes a method of removing the trace amount of sulfur compound described above in a gas, characterized in that a desulfurizing agent comprising one kind or more than two kinds of the Periodic Table VIII group metals (Fe, Co, Ni, Ru, Rh, Pd, Os, Ir, Pt) supported on an inorganic carrier containing zinc oxide by 50 wt. % or more is brought into contact with the gas. In its embodiment, there is disclosed an example of n-heptane desulfurization including pentyl mercaptan in which there is employed a desulfurizing agent with ruthenium (0.1 or 0.5 wt. %), platinum (0.1 wt. %) or nickel (0.5 wt. %) supported on a zinc oxide carrier.

In this method, no hydrogen is added at the time of desulfurization treatment. So, details of its reaction mechanism are not known. However, it is presumed that no hydrodesulfurization reaction occurs therein. Thus, there is no knowing whether the method can maintain the desulfurization performance for a long period of time without causing carbon deposition or how stably organic sulfur compound having higher desulfurization resistance than mercaptan, e.g. DMS, etc. can be removed.

In the hydrodesulfurization reaction, there is generally employed a catalyst containing Mo as its principal component and added with Ni or Co as a co-catalyst. This is believed to be attributable to the fact that Mo is inexpensive, yet provides high performance.

On the other hand, Ni or Co either alone does not provide high desulfurization performance. As for Ru too, though the above Document says it has high activity, cases of its actual use are few, partly because it is expensive.

Desulfurizing agents comprising combinations of Ru and Ni have also been proposed.

For instance, Patent Document 6 discloses a desulfurizing agent for hydrocarbon characterized in that it contains nickel by from 50 mass % to 95 mass % in terms of its oxide (NiO) conversion, molybdenum by from 0.5 mass % to 25 mass % in terms of its oxide ($MoO_3$) conversion, ruthenium by from 0.1 mass % to 12 mass % in terms of its oxide ($RuO_2$) conversion, and an inorganic oxide. This desulfurizing agent is said to be able to remove sulfur component in a hydrocarbon, such as kerosene, jet fuel, naphtha, gasoline, LPG, natural gas, etc in an extremely efficient manner and to significantly increase the 50 mass ppb breakthrough time.

However, in this document, since no hydrogen is added in the desulfurization treatment, it is presumed that no hydrodesulfurization reaction occurs, though details of the reaction mechanism remain unknown. Thus, it is unclear whether the desulfurization performance can be maintained for a long period of time or not. Further, although the document discloses the desulfurization performance for kerosene, the document fails to disclose any desulfurization performance for a raw fuel gas, so it remains unclear whether the method, when applied to a gaseous raw matter, can remove a sulfur content in the gas or not.

Although there are disclosed many examples of Ni-containing desulfurizing agents, there remains also a concern of promotion of carbon deposition if a large amount of Ni from 50 mass % to 95 mass % is used in the desulfurizing agent. Since Ni has high activity of decomposing hydrocarbon, if a hydrocarbon or olefin higher than C5 is contained in raw fuel gas, carbon deposition may be invited in a relatively short period of time, depending on operational condition, so that the function as the desulfurizing agent may sometimes be lost.

BACKGROUND ART DOCUMENTS

Patent Documents

Patent Document 1: Japanese Unexamined Patent Application No. 2001-286753 publication document
Patent Document 2: Japanese Unexamined Patent Application H. 1-123627 publication document
Patent Document 3: Japanese Unexamined Patent Application H. 1-123628 publication document
Patent Document 4: Japanese Unexamined Patent Application H. 11-61154 publication document
Patent Document 5: Japanese Unexamined Patent Application S. 61-263634 publication document
Patent Document 6: Japanese Unexamined Patent Application No. 2007-254728 publication document Non-Patent Documents Non-Patent Document 1: Shiba "Catalyst", Vol. 1. No. 1, p. 49 (1959)
Non-Patent Document 2: Matsuhisa "Catalyst", Vol. 48, No. 5, p. 326 (2006)
Non-Patent Document 3: S Satokawa, Y Kobayashi H. Fujiki Applied Catalysis B: Environmental. Vo. 56, p. 51 (2005)
Non-Patent Document 4: T. A. Pecoraro, R. R. Chianelli Journal of Catalysis. Vol. 67, p. 430 (1981)

SUMMARY OF THE INVENTION

Problems to be Solved by Invention

Thus, there remains a need for providing a desulfurizing agent for gases and a gas desulfurization method that can be used in such a situation where the mounting capacity is further limited and replacement thereof is restricted as is the case with a fuel cell and that yet can provide high desulfurization performance even at low temperatures and can maintain the desulfurization performance for an extended period of time.

The present invention has been made in view of the above-described state of the art and its principal object lies in providing a desulfurizing agent for gases and a gas desulfurization method using the agent that provide a high desulfurization performance even at low temperatures and can keep a concentration of sulfur compound which slips into a subsequent stage, at an extremely low level for a long period of time, but that has a high desulfurization capacity and that also can treat a gas for an extended period of time with use of a small amount of the desulfurizing agent.

Solution

For accomplishing the above-noted object, according to a characterizing feature of a desulfurizing agent for gases relating to the present invention, the desulfurizing agent comprises:

a zinc oxide, an aluminum oxide and copper, the agent further comprising nickel by from 1.0 mass % to 10 mass % and ruthenium by from 0.1 mass % to 1.0 mass %.

With the above-described configuration, the desulfurizing agent contains nickel and ruthenium as components thereof in a mixture of a zinc oxide, an aluminum oxide and copper. Here, the term "mixture" refers not only to a state of the components being mixed, but also such a state as a composite oxide.

And, with the above-described configuration, the desulfurizing agent has a high desulfurization performance for gases (gaseous matters such as a raw fuel gas) even at relatively low temperatures. Thus, when it is used as a desulfurizing agent for use in e.g. a desulfurizing reactor, it is possible to keep the concentration of sulfur compound that slips (leaks) to the subsequent stage (downstream side) of the desulfurizing reactor at an extremely low level for an extended period of time.

Further, the desulfurizing agent having the above-described configuration has a high desulfurization capacity. Thus, it is possible to reduce the amount of the desulfurizing agent used. Moreover, sulfur compound contained in the gas can be removed through its decomposition for an extended period of time.

Preferably, the desulfurizing agent having the above-described configuration contains, as the copper, copper in a metal state or a copper oxide, or more preferably, metal copper as its principal copper.

Preferably, the desulfurizing agent having the above-described configuration contains, as the nickel, nickel in a metal state or its oxide, or more preferably, nickel in a metal state (metal nickel) as its principal nickel.

Preferably, the desulfurizing agent having the above-described configuration contains, as the ruthenium, ruthenium in a metal state or its oxide, or more preferably, ruthenium in a metal state (metal ruthenium) as its principal ruthenium.

For accomplishing the above-noted object, according to a characterizing feature of a gas desulfurization method relating to the present invention:

a desulfurizing agent comprising a zinc oxide, an aluminum oxide and copper, and further comprising nickel by from 1.0 mass % to 10 mass % and ruthenium by from 0.1 mass % to 1.0 mass % is brought into contact with the gas in the coexistent of hydrogen, thus decomposing/removing sulfur compound contained in the gas.

With the above-described configuration, the desulfurizing agent has a high desulfurization performance for gases (gaseous matters such as a raw fuel gas) even at relatively low temperatures. Thus, it is possible to keep the concentration of sulfur compound that slips to the subsequent stage at an extremely low level for an extended period of time.

Further, with the above-described configuration, through utilization of its high desulfurization capacity of the desulfurizing agent, it is possible to decompose/remove sulfur compound contained in the gas for an extended period of time with a small amount of the desulfurizing agent used.

Advantageously, with the desulfurizing agent, its copper component, its ruthenium component and its nickel component will be reduced in advance in the coexistence of hydrogen. If the agent is brought into contact with the gas after such reduction, it will provide a high decomposition/removal performance for the sulfur compound advantageously.

EMBODIMENTS

Next, a desulfurizing agent for gases and a gas desulfurization method according to embodiments of the present invention will be explained.

The inventive desulfurizing agent is characterized in that it comprises a zinc oxide, an aluminum oxide and copper, and further comprising nickel by from 1 mass % to 10 mass % and ruthenium by from 0.1 mass % to 1.0 mass %.

As described in details hereinafter, the inventive desulfurizing agent is normally produced by being calcined in air. And, the agent is subjected to a reduction treatment before its use for a desulfurization reaction.

Zinc and aluminum are presumed to exist in oxidized states ($ZnO$, $Al_2O_3$) both under the produced stage and the reduced stage.

Copper, nickel and ruthenium are presumed to exist mainly as oxides ($Cu_2O$, $NiO$, $RuO_2$) in the stage of calcination in air (the produced stage), but exist in the metal states after the reduction treatment.

Namely, the inventive desulfurizing agent, under its produced stage, contains a zinc oxide, an aluminum oxide and a copper oxide.

Further, the inventive desulfurizing agent, at the time of its use, contains the zinc oxide, the aluminum oxide and copper (metal copper), and may sometimes contain the copper oxide also.

And, the inventive desulfurizing agent contains nickel by from 1.0 mass % to 10 mass % of the total mass of the desulfurizing agent in terms of conversion of nickel to its metal state. Further, the inventive desulfurizing agent contains ruthenium by from 0.1 mass % to 1.0 mass % of the total mass of the desulfurizing agent in terms of conversion of ruthenium to its metal state.

The inventive desulfurizing agent, at the time of its production, contains an oxide of nickel as its nickel component and contains an oxide of ruthenium as its ruthenium component.

Further, the inventive desulfurizing agent, at the time of its use, contains metal nickel as its nickel component and contains metal ruthenium as its ruthenium component. It may contain an oxide of nickel and an oxide of ruthenium, like the above-described case of copper.

The inventive desulfurizing agent is subjected to a reduction treatment in coexistence of hydrogen and then put into use by being brought into contact with the gas in the coexistence of hydrogen. With this, sulfur compound contained in the gas can be removed through its decomposition.

[Explanation of Production Method of Desulfurizing Agent]

The production method of the inventive desulfurizing agent is not particularly limited, but is produced preferably by a method similar to the method disclosed in Patent Document 4.

In the production method of the inventive desulfurizing agent, firstly, a water soluble copper compound such as copper nitrate ($Cu(NO_3)_2$) and a water soluble zinc compound such as zinc nitrate ($Zn(NO_3)_2$) are mixed with aqueous solution of an alkaline matter in the coexistence of an aluminum compound. In this, the aluminum compound may be in either a dissolved state or a gel state.

And, by this mixing, precipitation is caused.

Further, the resultant sediment is calcined, thus obtaining a mixture of the copper oxide, the zinc oxide and the aluminum oxide. In the following explanation, this mixture will be referred to as "copper oxide-zinc oxide-aluminum oxide mixture".

Next, the above-described mixture is molded into copper oxide-zinc oxide-aluminum oxide mixture molded body. Then, this copper oxide-zinc oxide-aluminum oxide mixture molded body is impregnated with aqueous solution containing nickel and ruthenium and then calcined. With this, nickel and ruthenium are supported on a carrier comprised of the copper oxide-zinc oxide-aluminum oxide mixture molded body, whereby the inventive desulfurizing agent is obtained.

The above-described molding can use molding by compression (compressive molding). As a method of such compressive molding, a tableting method can be used for instance.

Incidentally, as the copper oxide-zinc oxide-aluminum oxide mixture molded body, a commercially available one may be used. For instance, it is possible to employ a copper oxide-zinc oxide-aluminum oxide mixture molded body commercially sold as a desulfurizing agent, a methanol synthesis catalyst or a carbon monoxide converter catalyst.

In the case also of using such commercially available copper oxide-zinc oxide-aluminum oxide mixture molded body as the carrier, by impregnating this with aqueous solution containing nickel and ruthenium and then calcining the resultant product, the inventive desulfurizing agent can be obtained.

Incidentally, such commercially available copper oxide-zinc oxide-aluminum oxide mixture molded body may sometimes be added with a molding aid such as graphite. However, such molding aid, as long as its amount is not excessive, will not impair the function as the desulfurizing agent.

As a raw material for nickel for the preparation of the aqueous solution containing nickel and ruthenium, a water-soluble nickel compound can be employed. As such water-soluble nickel compound, nickel nitrate, nickel acetate, nickel chloride, etc. can be used.

Among the above-cited nickel raw materials, nickel nitrate and nickel acetate are particularly suitable, because these have high solubilities, thus being suitable. Another reason is that these do not cause residual of chlorine ions in the prepared desulfurizing agent, thus not impairing the desulfurization performance due to residual chlorine ions.

As raw materials of ruthenium for the preparation of aqueous solution containing nickel and ruthenium, ruthenium nitrate ($Ru(NO_3)_3$), ruthenium nitrosyl nitrate ($Ru(NO)(NO_3)_3$), ruthenium chloride, etc. can be used.

Among the ruthenium raw materials cited above, ruthenium nitrate and ruthenium nitrile acetate are particularly suitable, because these do not cause residual of chlorine ions in the prepared desulfurizing agent, thus not impairing the desulfurization performance due to residual chlorine ions.

The contents of copper, zinc and aluminum in the desulfurizing agent, in terms of mass ratios (contents in the desulfurizing agent) relative to the desulfurizing agent after its production and before its use, are CuO from 10 mass % to 50 mass %, ZnO from 30 mass % to 70 mass % and $Al_2O_3$ from 5 mass % to 20 mass %, approximately.

ZnO is an essential component needed for fixing sulfur as ZnS. As for the use amount of ZnO, if it is too little, the desulfurization capacity will be reduced.

Copper has a catalytic action for decomposition of organic sulfur compound. Further, in addition to this catalytic action, it contributes also to fixation of sulfur, as $Cu_2S$, CuS, etc. Therefore, if the use amount of copper is too small, desirable desulfurization performance cannot be obtained.

$Al_2O_3$ contributes to the specific surface area and strength. For this reason, if the use amount of $Al_2O_3$ is too small, the desulfurization performance will be reduced. Moreover, if the use amount of $Al_2O_3$ is too small, there is a risk of practical strength being not obtained.

The contents of nickel and ruthenium in the desulfurizing agent are Ni from 1.0 mass % to 10 mass % and Ru from 0.1 mass % to 1.0 mass %.

Preferably, in terms of mass ratios relative to the desulfurizing agent, they are Ni from 3.0 mass % to 10 mass % and Ru from 0.1 mass % to 1.0 mass %. More preferably, in terms of mass ratios relative to the desulfurizing agent, they are Ni from 3.0 mass % to 6.0 mass % and Ru from 0.1 mass % to 1.0 mass %.

Alternatively, the contents of nickel and ruthenium in the desulfurizing agent may be Ni from 1.0 mass % to 6.0 mass % and Ru from 0.1 mass % to 1.0 mass %. Or, in terms of mass ratios relative to the desulfurizing agent, they may be Ni from 1.0 mass % to 3.0 mass % and Ru from 0.1 mass % to 1.0 mass %.

The contents of nickel and ruthenium in the desulfurizing agent will be set from 0.01 to 1 in terms of mass ratio of Ru/Ni. Preferably, they will be set from 0.02 to 0.4 in terms of mass ratio of Ru/Ni.

In this way, by impregnating the carrier comprised of the copper oxide-zinc oxide-aluminum oxide mixture with aqueous solution having predetermined amounts of nickel and ruthenium dissolved therein; and then by evaporating the resultant product to dryness and the calcining it, the inventive desulfurizing agent can be obtained.

The calcination after the evaporation to dryness can be carried out at in air from 250° C. to 350° C. approximately for from 1 hour to 10 hours, approximately.

If the calcination temperature is too low, the decomposition of nickel or ruthenium compound used as a carrier will become insufficient, so that the desired performance will not be obtained.

On the other hand, if the calcination temperature is too high, this will result in decrease in the specific surface area of the desulfurizing agent, so the desired performance will not be obtained in this case also.

Incidentally, nickel and ruthenium may be supported on the carrier in a plurality of separate cycles.

Alternatively, it is also possible for nickel and ruthenium to employ a successive supporting method comprising a first step of supporting nickel on the carrier and a second step of supporting ruthenium on the carrier.

[Explanation of Desulfurization Method]

In the inventive desulfurization method of raw fuel gas G1 ("gas"), the desulfurizing agent obtained as above is subjected to a reduction treatment in the coexistence of hydrogen and then brought into contact with the raw fuel gas G1 ("gas") in the coexistence of hydrogen, whereby sulfur compound contained in the raw fuel gas G1 is decomposed and removed.

In the instant embodiment, as the desulfurization method, there will be explained a case in which the desulfurizing agent obtained as above (produced desulfurizing agent) is subjected to a reduction treatment in the coexistence of hydrogen and then brought into contact with the raw fuel gas G1 ("gas") in the coexistence of hydrogen, whereby sulfur compound contained in the raw fuel gas G1 is decomposed and removed.

In the inventive desulfurization method, when this method is employed for a raw fuel gas G1 as the gas (gaseous matter) such as natural gas, liquefied petroleum gas or a city gas containing these as raw materials, which contain light hydrocarbon as its principal component (from C1 to C4 approximately), the method achieves particularly distinguished performance.

Further, the inventive desulfurization method achieves particularly superior desulfurization performance for organic sulfur compound contained in the raw fuel gas G1, which is commonly employed as odorant, such as mercaptans (thiols) or sulfides (thioethers), exemplified by tertiary butyl methylcaptan (TBM), tetrahydrothiophene (THT), dimethyl sulfide (DMS), etc.

In the raw fuel gases G1 cited above, in addition to the above, hydrogen sulfide, carbonyl sulfide, disulfides, can also be contained. However, it is not problematic for such components to be mixed therein, if present in small amounts, as the inventive desulfurizing agent provides the removing ability for these too.

In addition to the above, in the raw fuel gases C1 cited above, depending on their method of production, trace amounts of hydrogen, oxygen, nitrogen, carbon dioxide and water can also be contained.

For instance, even with a natural gas-based city gas, in case biogas is mixed therein, hydrogen, carbon monoxide, oxygen, nitrogen and carbon dioxide may be present in the approximate maximum amounts of 4%, 0.05%, 0.01%, 1.0% and 0.5% (all based on their volumes), respectively.

Among the above, carbon monoxide and carbon dioxide can cause a methanation reaction in which they react with hydrogen on the desulfurizing agent to generate methane. So, if these are present at high concentrations, they are undesirable generally. However, the influences therefrom are small for the inventive desulfurizing agent, in comparison with a desulfurizing agent based mainly on Ni.

Oxygen should not be present since the desulfurizing agent may be oxidized thereby, thus inviting reduction of its desulfurization performance. However, if it is present by about 0.1%, it will react with hydrogen on the desulfurizing agent, thus being removed quickly, and a temperature rise due to the reaction will be small, thus being not problematic.

The desulfurizing agent (the "produced desulfurizing agent") will be subjected to a reduction treatment in existence of hydrogen before it is brought into contact with the raw fuel gas G1.

The temperature for carrying out the above-described reduction treatment ranges from 150° C. to 350° C., approximately.

The gas for use in the reduction treatment will be prepared by adding hydrogen (hydrogen gas) by from 1 vol. % to 10 vol. % approximately to an inactive gas such as nitrogen.

As for the reduction period, a period needed for achieving reduction stoichiometrically will be calculated from the flow rate and hydrogen content of the gas used in the reduction treatment; and the actual period will be set preferably to be from 1.5 times to 3 times approximately of the calculated period.

If the reduction temperature is too low, the reduction will not be completed. Whereas, if it is too high, this will result in reduction in the performance due to calcining of the desulfurizing agent.

If the hydrogen concentration of the gas (the volume concentration of hydrogen gas) used in the reduction treatment is too low, this will require a large amount of gas to be supplied until completion of the reduction, thus being disadvantageous economically. Conversely, if the hydrogen concentration of the gas used in the reduction treatment is too high, this will disadvantageously invite sharp temperature rise by a reaction heat from the reaction between hydrogen and the desulfurizing agent under the oxidized state. For instance, such sharp temperature rise may make it impossible to maintain a predetermined reduction temperature.

The desulfurization method of the present invention is implemented by charging the desulfurizing agent in a desulfurizing agent container, keeping the desulfurizing agent at a predetermined temperature by e.g. external heating and then passing a raw fuel gas G1 added with hydrogen therethrough.

The desulfurization reaction does not cause significant heat generation or heat absorption, as long as the concentration of sulfur component is not extremely high.

Therefore, it is also possible to preheat the raw fuel gas G1 or raw fuel gas G1 added with hydrogen gas to a temperature favorable for desulfurization, so that the reaction may take place adiabatically without much heating or cooling of the desulfurizing agent container per se. For example, the raw fuel gas G1 or raw fuel gas G1 added with hydrogen gas may be preheated to from 150° C. to 350° C. approximately, which is the temperature for carrying out the above-described reduction treatment.

The amount of hydrogen to be added can be determined based on the kind and amount of sulfur compound contained in the raw material. Yet, as the content of sulfur compound ranges normally in the ppm level, the hydrogen amount will be set to 0.001 or more, preferably to from 0.01 to 0.5 approximately, more preferably to from 0.01 to 0.2 approximately in terms of mole ratio relative to the raw fuel gas G1.

If the desulfurization is effected as a pretreatment (preprocessing) for a steam reforming process, hydrogen resulting from the steam reforming reaction may partly be recycled, if needed or appropriate.

Such hydrogen resulting from the steam reforming reaction may sometimes contain carbon monoxide or carbon dioxide or steam. However, these will not be significantly problematic as long as the amounts thereof do not exceed 0.01 approximately in terms of mole ratio relative to the raw fuel gas G1.

[Explanation of Desulfurization System]

Figure 1:
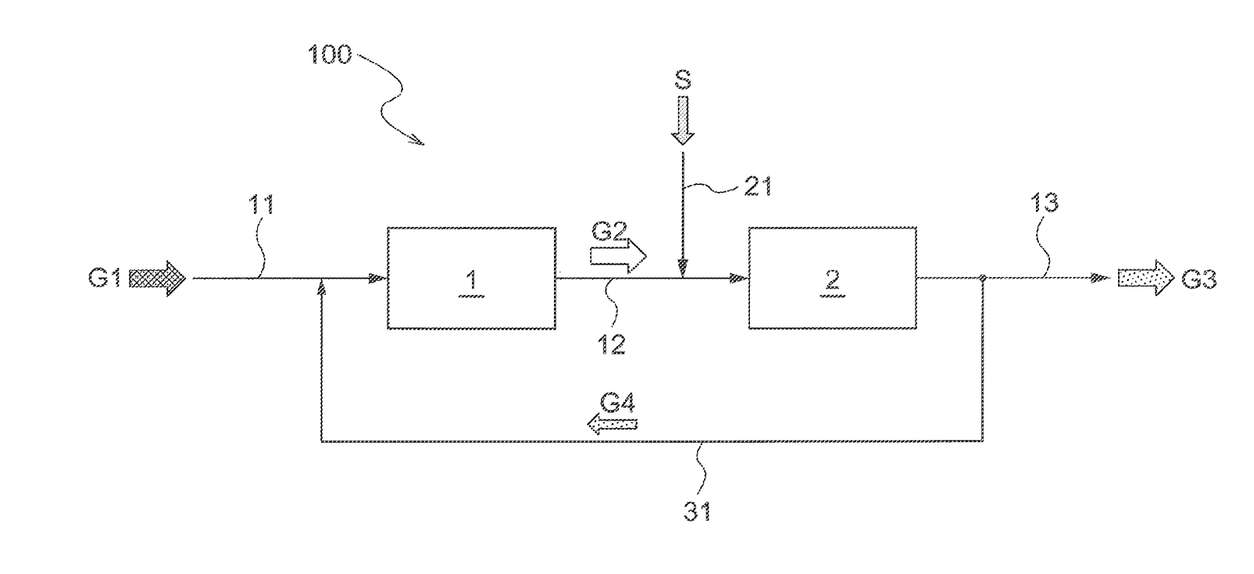
FIG. 1 is a flow diagram of a desulfurization system realizing a desulfurization method using a desulfurizing agent.

FIG. 1 shows a schematic flow diagram (one example) of a desulfurization system for carrying out desulfurization as a pretreatment for a steam reforming process.

A desulfurization system 100 shown in FIG. 1 includes a desulfurizing reactor 1 in which an amount of desulfurizing agent is charged, and a reformer 2 in which a reforming catalyst is charged. The desulfurization system 100 is a reaction system configured to desulfurize a raw fuel gas G1 supplied and to steam-reform this gas to obtain a reformed fuel gas G3 containing hydrogen.

Next, additional explanation will be made respecting the desulfurization system 100.

As the raw fuel gas G1 is supplied to the desulfurizing reactor 1 via a supply passage 11 to be made into a desulfurizing agent outlet gas G2.

This desulfurizing agent outlet gas G2 is supplied from the desulfurizing reactor 1 via a reformer passage 12 to the reformer 2 connected on the downstream side. To the reformer passage 12, a steam supplying passage 21 is connected to supply steam S as water to the reformer passage 12. Therefore, to the reformer 2, the desulfurizing agent outlet gas G2 and the steam S are supplied.

The desulfurizing agent outlet gas G2 which has been reformed through the reformer 2 is made into a reformed fuel gas G3. This reformed fuel gas G3 is supplied to a next stage such as a fuel cell (not shown) via a reformed gas passage 13 connected to the downstream side of the reformer 2.

A part of the reformed fuel gas G3 is returned as a recycle gas G4 to the desulfurizing reactor 1 via a return passage 31 branched from the reformed gas passage 13 and connected to the supply passage 11.

EXPLANATION OF EXAMPLES

Next, examples will be shown and the present invention will be explained in greater details.

Incidentally, it is noted that the present invention is not limited by these examples.

Example 1

23 g of aqueous solution in which ruthenium nitrate (containing 0.062 g of Ru) and nickel nitrate (containing 0.927 g of Ni) was dissolved was dripped on 30.02 g of a commercially available copper oxide-zinc oxide-aluminum oxide mixture molded body (MDC-7, 3 mm tablet: produced by SUED-CHEMIE CATALYSTS JAPAN, INC.: CuO: 45 mass %, ZnO: 45 mass %, $Al_2O_3$: 6 mass %) as a carrier to be impregnated therein for 3 hours.

Thereafter, after evaporation to dryness on a hot plate as a heater, the product was dried for 1 hour in a drier set to 110° C. and by using a muffle furnace as a calciner, the temperature was raised by 10° C. per minute in air to 300° C. And, as calcination, the temperature was maintained at 300° C. for 1 hour. Thus, there was obtained a desulfurizing agent A containing 0.2 mass % of Ru and 3 mass % of Ni.

10 g of the desulfurizing agent A was charged in a reaction tube (inside diameter 14 mm) made of heat resistant glass to form a desulfurizing agent layer. This desulfurizing agent layer corresponds to the "desulfurizing reactor 1".

And, with heating to maintain the lower end portion (outlet side) of this desulfurizing agent layer at 250° C., a reduction gas made of nitrogen gas mixed with 2% of hydrogen gas (based on volume) was flown at 60 liters per hour (the volume under the standard state of 0° C., 1 atmosphere) to carry out a reduction treatment for 1 hour. Namely, the desulfurizing agent A was reduced in the existence of hydrogen.

After the reduction treatment described above, with keeping the lower end portion of the desulfurizing agent layer at 250° C., nitrogen gas containing 150 ppm of DMS and 2% of hydrogen (both based on volumes) was flow at 20 liters per hour (the volume under the standard state of 0° C., 1 atmosphere). Namely, the desulfurizing agent A was brought into contact with the raw fuel gas G1 in coexistence of hydrogen. Here, for the sake of simplicity of experiment, as a component of the raw fuel gas G1, nitrogen was used in place of a hydrocarbon such as methane, etc. That is, as the raw fuel gas G1, there was employed a model gas in the reducing atmosphere made of nitrogen (a substitute gas for hydrocarbon) added with a predetermined amount of DMS as sulfur compound (odorant).

Then, concentrations of DMS, hydrogen sulfide and methane contained in the desulfurizing agent outlet gas G2 were analyzed by a gas chromatograph (GC-14B manufactured by Shimadzu Corporation, equipped with FPD and FID detectors).

The DMS concentration of the desulfurizing agent outlet gas G2 was not detected initially, but became 3.8 ppb after 22 hours, 5.0 ppb after 23 hours, 5.3 ppb after 24 hours and 6.6 ppb after 25 hours, respectively.

When the period until the DMS concentration of the desulfurization gas G2 exceeds 5 ppb ("5 ppb breakthrough time") is used as a reference of life, the period is 23.0 hours under this condition.

Incidentally, up to the lapse of 25 hours, no hydrogen sulfide was detected in the desulfurizing agent outlet gas G2 and the methane concentration was substantially constant at about 300 ppm. It is believed that DMS was decomposed into hydrogen sulfide and methane and the hydrogen sulfide was absorbed by the desulfurizing agent.

Example 2

With setting made same as Example 1 except for changes made in the Ni amount and Ru amount, there was obtained a desulfurizing agent B containing 0.2 mass % of Ru and 1 mass % of Ni. With evaluation of its desulfurization performance carried out similarly to Example 1, there was obtained a 5 ppb breakthrough time of 9.4 hours.

Comparison Example 1

The copper oxide-zinc oxide-aluminum oxide mixture molded body used in Example 1 was directly (i.e. as it was) used as a desulfurizing agent (desulfurizing agent C).

When evaluation of desulfurization performance was made similarly to Example 1, the DMS concentration of the desulfurizing agent outlet gas G2 was not detected initially, but became 3.4 ppb after 6 hours, 18.9 ppb after 7 hours, and 64.2 ppb after 8 hours, and the 5 ppb breakthrough time was 6.2 hours.

Comparison Example 2

A desulfurizing agent D containing 0.2 mass % of Ru was obtained by setting similar to Example 1 except that no Ni was used.

When evaluation of desulfurization performance was made similarly to Example 1, there was obtained the 5 ppb breakthrough time of 8.2 hours.

Comparison Example 3

A desulfurizing agent E containing 1.0 mass % of Ru was obtained by setting similar to Comparison Example 2 except that the Ru amount was changed.

When evaluation of desulfurization performance was made similarly to Example 1, there was obtained the 5 ppb breakthrough time of 8.6 hours.

Comparison Example 4

A desulfurizing agent F containing 3 mass % of Ni was obtained by setting similar to Example 1 except that no Ru was used.

When evaluation of desulfurization performance was made similarly to Example 1, there was obtained the 5 ppb breakthrough time of 20.6 hours.

Comparison Example 5

A desulfurizing agent G containing 1 mass % of Ni was obtained by setting similar to Example 2 except that no Ru was used.

When evaluation of desulfurization performance was made similarly to Example 1, there was obtained the 5 ppb breakthrough time of 7.0 hours.

The results of Example 1, Example 2 and Comparison Examples 1-5 are summarized in Table 1.

The desulfurizing agent A supporting 0.2 mass % of Ru and 3 mass % of Ni provided the 5 ppb breakthrough time of 23.0 hours, which is about 4 times as long as the breakthrough time of 6.2 hours provided by the desulfurizing agent C which is the copper oxide-zinc oxide-aluminum oxide mixture disclosed in Patent Documents 2, 3.

The desulfurizing agent D supporting 0.2 mass % of Ru and the desulfurizing agent E supporting 1.0 mass % of Ru provided the breakthrough times of 8.2 hours and 8.6 hours, respectively. The desulfurizing agent F supporting 3 mass % of Ni provided the breakthrough time of 20.6 hours. Thus, with supporting of Ru alone, the effect of extension of breakthrough time was small, and supporting of 0.2 mass % of Ru provided only extension of 2.0 hours. With supporting of 0.2 mass % of Ru and 3 mass % of Ru, the breakthrough time was extended for 16.8 hours, which is longer than the total of 14.5 hours with the 3 mass % Ni alone and 2.0 hours with the 0.2 mass % Ru alone. Thus, it is apparent that the combination of Ni and Ru provided by the present invention achieves a synergy effect for achieving the desulfurization performance.

Further, the desulfurizing agent B supporting 1 mass % of Ni and 0.2 mass % of Ni provided the 5 ppb breakthrough time of 9.4 hours and the desulfurizing agent G supporting 1 mass % of Ni provided the breakthrough time of 7.0 hours. In comparison with the breakthrough time of the desulfurizing agent C as a carrier as a "reference", the supporting of 1 mass % of Ni provided the 5 ppb breakthrough time extension of 0.8 hour and the supporting of 0.2 mass % of Ru provided the 5 ppb breakthrough time extension of 2.0 hours, giving a total value of 2.8 hours. In contrast, as the desulfurizing agent B supporting 1 mass % of Ni and 0.2 mass % of Ru provided the extension of 3.2 hours. Thus, it should be apparent that even with the supporting amount Ni being 1 mass %, supporting of Ru in addition to Ni, there is achieved a synergy effect for providing the desulfurization performance.

That is, the desulfurizing agents A and B have high desulfurization performances for sulfur compounds such as DMS and hydrogen sulfide even at low temperatures such as 250° C. approximately and can maintain the concentration of the sulfur compound which slips (leaks) to the subsequent stage (the downstream side of the desulfurizing reactor 1) at an extremely low level for a long period of time and have high desulfurization capacities also, so they can treat (desulfurize) the raw fuel gas G1 for a long period of time, even with small use amounts of desulfurizing agents.

TABLE 1

|  |  |  | 5 ppb breakthrough time (hours) |
|---|---|---|---|
| Example 1 | desulfurizing agent A | 0.2 mass % Ru-3 mass % Ni | 23.0 |
| Example 2 | desulfurizing agent B | 0.2 mass % Ru-1 mass % Ni | 9.4 |
| Comparison Example 1 | desulfurizing agent C | none | 6.2 |
| Comparison Example 2 | desulfurizing agent D | 0.2 mass % Ru | 8.2 |
| Comparison Example 3 | desulfurizing agent E | 1 mass % Ru | 8.6 |
| Comparison Example 4 | desulfurizing agent F | 3 mass % Ni | 20.6 |
| Comparison Example 5 | desulfurizing agent G | 1 mass % Ni | 7.0 |

Example 3

37 g of aqueous solution in which ruthenium nitrate (containing 0.050 g of Ru) and nickel nitrate (containing 3.201 g of Ni) was dissolved was dripped on 50.02 g of a commercially available copper oxide-zinc oxide-aluminum oxide mixture molded body (MDC-7, 3 mm tablet: produced by SUED-CHEMIE CATALYSTS JAPAN, INC.: CuO: 41 mass %, ZnO: 46 mass %, $Al_2O_3$: 9 mass %) as a carrier to be impregnated therein for 3 hours.

Thereafter, after evaporation to dryness on a hot plate as a heater, the product was dried overnight in a drier set to 110° C. and by using a muffle furnace as a calciner, the temperature was raised by 2° C. per minute in air to 300° C. And, as calcination, the temperature was maintained at 300° C. for 1 hour. Thus, there was obtained a desulfurizing agent H containing 0.1 mass % of Ru and 6 mass % of Ni. Evaluation of its desulfurization performance effected similarly to Example 1 provided a 5 ppb breakthrough time of 33.4 hours.

Example 4

With setting similar to Example 3 except for change made in the Ru amount, there was obtained a desulfurizing agent I containing 0.2 mass % of Ru and 6 mass % of nickel. Evaluation of its desulfurization performance effected similarly to Example 1 provided a 5 ppb breakthrough time of 37.8 hours.

Comparison Example 6

With setting similar to Example 3 except for no use of Ru, there was obtained a desulfurizing agent J containing 6 mass % of nickel. Evaluation of its desulfurization performance effected similarly to Example 1 provided a 5 ppb breakthrough time of 30.8 hours.

Comparison Example 7

The copper oxide-zinc oxide-aluminum oxide mixture molded body used in Example 3 was directly (i.e. as it was) used as a desulfurizing agent (desulfurizing agent K). Evaluation of its desulfurization performance effected similarly to Example 1 provided a 5 ppb breakthrough time of 5.3 hours.

The results of Example 3, Example 4 and Comparison Example 6 and Comparison Example 7 are summarized in Table 2.

The desulfurizing agent H supporting 0.1 mass % of Ru and 6 mass % of Ni provided the 5 ppb breakthrough time of 33.4 hours and the desulfurizing agent I supporting 0.2 mass % of Ru and 6 mass % of Ni provided the 5 ppb breakthrough time of 37.8 hours, showing clearly better results as compared with 5.3 hours provided by the desulfurizing agent K which is the copper oxide-zinc oxide-aluminum oxide mixture molded body disclosed in Patent Documents 2, 3.

Further, comparison among Comparison Example 6, Example 3 and Example 4 show that the desulfurizing agent J supporting 6 mass % of Ni only provided the 5 ppb breakthrough time of 30.8 hours, whereas the desulfurizing agent H supporting 0.1 mass % of Ru and 6 mass % of Ni provides 33.4 hours and the desulfurizing agent I supporting 0.2 mass % of Ru and 6 mass % of nickel provides 37.8 hours, indicating the larger the amount of Ru supported, the longer the breakthrough time. From this result, it is apparent that desulfurizing agents containing both Ni and Ru achieve distinguishingly higher desulfurization performance.

TABLE 2

|  |  |  | 5 ppb breakthrough time (hours) |
|---|---|---|---|
| Example 3 | desulfurizing agent H | 0.1 mass % Ru-6 mass % Ni | 33.4 |
| Example 4 | desulfurizing agent I | 0.2 mass % Ru-6 mass % Ni | 37.8 |
| Comparison Example 6 | desulfurizing agent J | 6 mass % of Ni | 30.8 |

TABLE 2-continued

| | | | 5 ppb breakthrough time (hours) |
|---|---|---|---|
| Comparison Example 7 | desulfurizing agent K | none | 5.3 |

Example 5

[Desulfurization Test of City Gas]

24 g of aqueous solution in which ruthenium nitrate (containing 0.070 g of Ru) and nickel nitrate (containing 2.099 g of Ni) was dripped on 35 g of the same molded body used as a carrier in Example 3 to be impregnated therein for 3 hours.

Thereafter, after evaporation to dryness on a hot plate as a heater, the product was dried for 1 hour in a drier set to 110° C. and by using a muffle furnace as a calciner, the temperature was raised by 3° C. per minute in air to 300° C. And, as calcination, the temperature was maintained at 300° C. for 1 hour. Thus, there was obtained a desulfurizing agent L containing 0.2 mass % of Ru and 6 mass % of Ni.

10 cc (12.5 g) of the desulfurizing agent L was charged in a stainless-made reaction tube (inside diameter 15.7 mm). The stainless-made reaction tube charged with the desulfurizing agent L corresponds to the "desulfurizing reactor 1". The reaction tube as a whole was placed in a thermostatic oven kept at 250° C. And, a reduction gas made of nitrogen gas mixed with 2% of hydrogen gas (based on volume) was flown at 150 liters per hour (the volume under the standard state of 0° C., 1 atmosphere) to carry out a reduction treatment for 3 hours.

After the reduction treatment, with keeping the temperature of the thermostatic oven at 250° C., 13A city gas mixed with 2% of hydrogen (based on volume) was flown as a raw fuel gas G1 at 60 liters per hour (volume under a normal state of 0° C. and 1 atmosphere). Incidentally, this 13A city gas as the raw fuel gas G1 contains about 3.1 ppm of DMS and about 2.4 ppm of TBM as odorants (sulfur compounds).

Then, concentrations of DMS, TBM and hydrogen sulfide contained in the desulfurizing agent outlet gas G2 were analyzed by a gas chromatograph (GC-14B manufactured by Shimadzu Corporation, equipped with FPD detector).

The DMS concentration of the desulfurizing agent outlet gas G2 was not detected initially, but became 17 ppb after 158 hours, 19 ppb after 160 hours and 28 ppb after 162 hours, respectively.

The period until the DMS concentration of the desulfurizing agent outlet gas G2 exceeded 20 ppb (i.e. 20 ppb breakthrough time) was 160.3 hours under the conditions. Incidentally, up to the lapse of 200 hours, no TBM or hydrogen sulfide was detected in the desulfurizing agent outlet gas G2. It is believed that TBM was decomposed by the desulfurizing agent and the hydrogen sulfide was absorbed by the desulfurizing agent.

Comparison Example 8

10 cc (12.4 g) of the same desulfurizing agent J used in Comparison Example 6 was charged in a stainless-made reaction tube (inside diameter 15.7 mm). The stainless-made reaction tube charged with the desulfurizing agent J corresponds to the "desulfurizing reactor 1". Evaluation of the desulfurization performance effected similarly to Example 5 provided a 20 ppb breakthrough time of 90.3 hours.

The results of Example 5 and Comparison Example 8 are summarized in Table 3.

The desulfurizing agent J supporting 6 mass % of Ni alone provided the breakthrough time of 90.3 hours whereas the desulfurizing agent L supporting 0.2 mass % of Ru and 6 mass % of Ni provided the breakthrough time of 160.3 hours. From this result, it become clear that the desulfurizing agents including both Ru and Ni achieve high performance in desulfurization of a gas containing hydrocarbon as its principal component.

That is, the desulfurizing agent L has high desulfurization performances for sulfur compounds such as DMS, TBM and hydrogen sulfide even at low temperatures such as 250° C. approximately and can maintain the concentration of the sulfur compound which slips (leaks) to the subsequent stage at an extremely low level for a long period of time and has high desulfurization capacity also, so it can treat (desulfurize) the raw fuel gas G1 for a long period of time, even with small use amount of the desulfurizing agent.

TABLE 3

| | | | 20 ppb breakthrough time (hours) |
|---|---|---|---|
| Example 5 | desulfurizing agent L | 0.2 mass % Ru-6 mass % Ni | 160.3 |
| Comparison Example 8 | desulfurizing agent J | 6 mass % Ni | 90.3 |

Other Embodiments (1) In the foregoing embodiment, there was shown an example of the desulfurization system 100 in which the desulfurizing reactor 1 is provided on the upstream side of the reformer 2 (namely, the case of a reformer 2 being present on the downstream side of the desulfurizing reactor 1).

However, the desulfurization system 100 need not be used in combination with a reformer 2, but may be used in combination with any processing device such as another reactor or the like.

(2) In the foregoing embodiment, there was shown an example in which the gas contains nitrogen as its principal component and an example in which the gas is a raw fuel gas G1. However, the inventive desulfurizing agent and desulfurization method can achieve their desulfurization effect in case also where the gas contains other component as long as the gas contains hydrogen and this gas can be brought into contact with the desulfurizing agent in the reducing atmosphere.

(3) In the foregoing embodiment, there was shown an example of the desulfurization method in which copper of the produced desulfurizing agent is a copper oxide and before this produced desulfurizing agent is put in use of a desulfurization reaction, it is subjected to a reduction treatment before being used for desulfurization. However, in case copper of the produced desulfurizing agent is metal copper, the reducing treatment need not be included.

Similarly, in the foregoing embodiment, there was shown an example of the desulfurization method in which nickel component of the produced desulfurizing agent is an oxide and before this produced desulfurizing agent is put in use of a desulfurization reaction, it is subjected to a reduction treatment before being used for desulfurization. However, in case the nickel component of the produced desulfurizing agent is metal nickel, the reducing treatment need not be included.

Further, in the foregoing embodiment, there was shown an example of the desulfurization method in which ruthenium component of the produced desulfurizing agent is an oxide and before this produced desulfurizing agent is put in use of a desulfurization reaction, it is subjected to a reduction treatment before being used for desulfurization. However, in case ruthenium component of the produced desulfurizing agent is metal ruthenium, the reducing treatment need not be included.

In the meantime, the arrangements disclosed in the foregoing embodiment (including the further embodiments) can be used in combination with arrangements disclosed in the other embodiments as long as such combination does not result in contradiction. Further, it is understood that the embodiments disclosed in this detailed disclosure are only illustrative, and the scope of the present invention is not limited thereto. In fact, various modifications can be made appropriately within a range not deviating from the essence of the invention.

INDUSTRIAL APPLICABILITY

This invention is applicable to a desulfurizing agent and a desulfurization method for a raw fuel gas for use in e.g. a reformer for a fuel gas of a fuel cell.

DESCRIPTION SIGNS

1: desulfurizing reactor
2: reformer
11: supply passage
12: reformer passage
13: reformed gas passage
21: steam supply passage
31: return passage
G1: raw fuel gas
G2: desulfurizing agent outlet gas
G3: reformed fuel gas
G4: recycle gas
S: steam
100: desulfurization system

The invention claimed is:

1. A desulfurizing agent for gases comprising a zinc oxide, an aluminum oxide and copper, the agent further comprising nickel from 1.0 mass % to 10 mass % and ruthenium from 0.1 mass % to 1.0 mass %.

2. A method of desulfurizing gas, comprising:
contacting a gas containing a sulfur compound in the coexistence of hydrogen with a desulfurizing agent comprising a zinc oxide, an aluminum oxide and copper,
wherein the desulfurizing agent further comprises nickel from 1.0 mass % to 10 mass % and ruthenium from 0.1 mass % to 1.0 mass %,
thus decomposing or removing the sulfur compound contained in the gas.

* * * * *